United States Patent [19]

Kiko

[11] 4,331,842

[45] May 25, 1982

[54] VOICE FREQUENCY REPEATER AND TERM SETS AND OTHER CIRCUITS THEREFOR

[75] Inventor: Frederick J. Kiko, Shenandoah, Ga.

[73] Assignee: Reliance Electric Company, Cleveland, Ohio

[21] Appl. No.: 120,125

[22] Filed: Feb. 11, 1980

[51] Int. Cl.³ ............................................... H04B 1/58
[52] U.S. Cl. .......................... 179/170 NC; 179/170 R
[58] Field of Search ......... 179/170 R, 170 NC, 170 T

[56] References Cited

U.S. PATENT DOCUMENTS

| | | | |
|---|---|---|---|
| 3,700,831 | 10/1972 | Aagaard et al. | 179/170 NC |
| 3,849,609 | 11/1974 | Voorman | 179/170 T |
| 3,970,805 | 7/1976 | Thomas | 179/170 NC |
| 4,041,252 | 9/1977 | Cowden | 179/170 NC |
| 4,053,722 | 10/1977 | Nahay | 179/170 NC |

*Primary Examiner*—Vincent P. Canney
*Assistant Examiner*—Randall P. Myers
*Attorney, Agent, or Firm*—Michael M. Rickin; Harrison E. McCandlish

[57] ABSTRACT

An electronic hybrid voice frequency repeater having a pair of term sets interconnected by a four-wire circuit for separating the two directions of signal transmission and amplifying each direction separately. Each term set couples the repeater's four-wire circuit to a two-wire line and has a differential current driver for driving the two-wire line and a differential amplifier connected in a feedback loop for sensing the differential signal voltage across the two-wire line, to drive the current driver and to feed an incoming differential signal on the two-wire line to the repeater's four-wire circuit while nulling signals arriving at the term set from the four-wire circuit to prevent them from returning to the four-wire circuit. Other features disclosed include a low frequency clamping circuit, an adjustable-gain amplifier, and an equalizer for non-loaded cable.

4 Claims, 8 Drawing Figures

Fig. 5

VOICE FREQUENCY REPEATER AND TERM SETS AND OTHER CIRCUITS THEREFOR

FIELD OF THE INVENTION

This invention generally relates to electronic hybrid, two-wire voice frequency repeaters and is particularly concerned with term sets and other circuits which are usable in such repeaters and which are also useful in other applications.

BACKGROUND

Voice frequency repeaters are used in telephone communication systems to compensate for line attenuation of the audio or voice frequency signals when the line is relatively long. One typical repeater configuration separates the two directions of signal transmission (as between a central office and a subscriber's telephone) and inserts gain in each direction separately, thus achieving amplification of the signals transmitted in both directions. The present invention is concerned with this type of repeater as opposed to a negative resistance repeater which produces its gain by using a negative attenuation pad technique or the like.

To accomplish separation of the bidirectional signals for amplifying each direction separately, the electronic hybrid repeater is equipped with a pair of term (i.e., terminating) sets and a four-wire circuit connected between the two term sets. A four-wire circuit provides two lines (one of which may be common) for each direction of signal transmission, while a two-wire line provides signal transmission in both directions on the same two-wire line. A hybrid circuit in one term set couples the repeater's four-wire circuit to a two-wire circuit such as a two-wire transmission line between the repeater and the subscriber's telephone. A hybrid circuit in the other term couples the repeater's four-wire circuit to another two-wire circuit such as the one in the central office.

The hybrid repeater's four-wire circuit has two separate signal transmission paths or portions, one being used to transmit signals in one direction from a first one of the term sets to the second one of the term sets, and the other being used to transmit signals in the opposite direction from the second term set to the first term set. Each term set separates the bidirectional signals, whereby signals in only one direction are transmitted over one of the four-wire transmission paths, and signals in only the opposite direction are transmitted over the other of the four-wire transmission paths. Each of the signal transmission paths or portions in the repeater's four-wire circuit is provided with an amplifier to thus amplify each direction of transmission separately.

Prior to this invention various forms of hybrid circuits have been proposed to accomplish the foregoing function in a repeater and, more generally, to provide an interface between a two-wire line, on the one hand, and a four-wire line on the other hand.

Perhaps the most commonly used hybrid circuit design is a hybrid transformer known as a hybrid coil. Although such hybrid transformers have been in use for many years, they suffer from the disadvantages of comparatively large size and high cost, among other things. To avoid these problems, various forms of transformerless or electronic hybrid circuits have been proposed such as the ones described in U.S. Pat. No. 4,064,377 issued on Dec. 20, 1977, U.S. Pat. No. 4,053,722 issued on Oct. 11, 1977, and U.S. Pat. No. 3,855,430 issued on Dec. 17, 1974. Prior amplifier circuits used to establish current sources are described in U.S. Pat. No. 3,870,896 issued on Mar. 11, 1975.

SUMMARY AND OBJECTS OF INVENTION

Compared with prior term sets or hybrid circuits, the present invention is more simplified and is so designed that it requires no transformer coils for line coupling and no more than three amplifiers. This is accomplished by providing the term set with a differential current driver and with a single voltage-sensing differential amplifier. In the illustrated embodiment, the differential current driver has a pair of amplifiers for converting an incoming, single-ended or unbalanced signal arriving at the term set's receive port into a balanced differential signal for application to the term set's two-wire port. The voltage sensing amplifier and the amplifiers in the differential current driver may advantageously be operational amplifiers.

To reduce the number of amplifiers required in the term set, the voltage-sensing amplifier is uniquely connected in the term set's circuit to perform plural functions. First, it forms a part of a feedback loop which is connected to the differential current driver and which has a differential input coupled to the term set's two-wire port to sense the differential voltage at the two-wire port for driving the differential current driver in such a way that the latter generates a simulated terminating impedance across the term set's two-wire port. Second, it converts incoming differential signals arriving at the term set's two-wire port into single-ended or unbalanced signals for application to the term set's transmit port. Third, it is connected to a bridge circuit in such a manner that incoming signals arriving at the term set's single-ended receive port from the four-wire circuit are prevented from being returned to the term set's transmit port when the bridge circuit is balanced. In addition to the foregoing, the connections of the voltage-sensing amplifier are such that all of the longitudinal signals requiring rejection are lumped together at the differential input of the voltage-sensing amplifier to make it easier to trim the circuit for longitudinal rejection.

According to a further feature of this invention, a novel amplifier circuit is provided with a gain that is selectively adjustable in equal db increments. For a repeater application such adjustable gain amplifiers are used one in each of the unidirectional transmission paths of the repeater's four-wire circuit to supply the correct amount of gain in each direction. Such an adjustable gain amplifier has the advantage of requiring relatively few switches to provide desired gain adjustment and is of simplified, low cost construction in which the gain adjustment is conveniently set up or calibrated directly in db.

According to yet another feature of this invention, a novel voltage dividing, low frequency clamping circuit provides for the clamping of low frequency, high level signals which would tend to overdrive such equipment as the term set's current driver with resultant signal distortion and possible oscillation or singing in the repeater circuit. The clamping circuit of this invention is of unique low-cost, simplified design and performs voltage divider and high pass filter functions to reduce low frequency out-of-band gain for improved stability.

With the foregoing in mind, a major purpose and aim of this invention is to provide a novel hybrid voice frequency repeater of simplified, low cost design.

Another major object of this invention is to provide a novel term set of simplified low cost design in which a voltage-sensing differential amplifier uniquely performs a plurality of functions to reduce the number of amplifiers required in the term set.

Still another object of this invention is to provide a novel low frequency clamping circuit which improves the stability of the repeater circuit.

Still another object of this invention is to provide a novel amplifier circuit having a simplified adjustable gain set up directly in equal db increments in which just one switch and resistor combination is used for producing each db increment.

Yet another object of this invention is to provide a novel equalizer circuit for flattening or equalizing the signal frequency response across a pre-selected frequency band. This equalizer is set up to adjust the equalization directly in equal db increments to thereby simplify the equalization required in repeaters that are used with non-loaded cable. As compared with prior techniques, no conversion tables are required for converting into db loss or gain because the adjustment provided by the equalizer of this invention is calibrated directly in equal db increments. Additionally, the equalizer of this invention requires relatively few switches for obtaining a satisfactory number of incremental adjustments.

In this description a single-ended or unbalanced signal is considered to be a signal referenced from a one-conductor line to ground or common, and a differential signal is considered to be the difference between two signals on the conductors of a two-wire line which are not necessarily referenced to ground. Ground and common (as in a split voltage source) are considered to be the same and are regarded as being at zero volts or virtually zero volts.

Further objects of this invention will appear as the description proceeds in connection with the below described drawings and the appended claims.

DETAILED DESCRIPTION

In the illustrated embodiment the principles of this invention are incorporated into a voice frequency electronic hybrid two-wire repeater (indicated at 10 in FIG. 1) for a voice frequency telephone communication system. It will be appreciated, however, that the term set, low frequency clamp and other features of this invention are not limited to repeaters and, instead, are useful in other applications.

Figure 1:
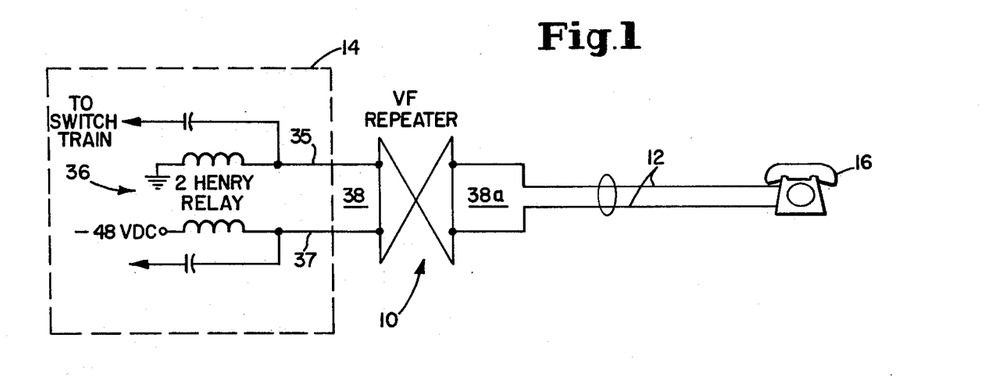
FIG. 1 is a schematic diagram of a voice frequency telephone communication system utilizing a repeater which incorporates the principles of this invention.

For the illustrated telephone communication system, repeater 10 is customarily connected to the central office end of a two-wire transmission line 12 between line 12 and the central office equipment in a central office 14. Line 12 is typically in the form of a cable and connects a subscriber's telephone 16 to the central office as shown. Although repeater 10 is shown to be at the central office end of transmission line 12 remote from telephone 16, it will be appreciated that the repeater could be designed for location at some other point along the transmission line path such as the mid-point of the transmission line or at PBX locations.

The repeater configuration shown in the drawings separates the two directions of transmission and inserts gain in each direction separately, thus achieving amplification of signals transmitted in both directions between the central office and telephone 16. To accomplish this, repeater 10 comprises a pair of transformerless, electronic hybrid circuits or term (i.e., terminating) sets 18 and 20 and a four-wire circuit 21 containing a pair of one-way amplifiers 22 and 24. Each amplifier, as will be described later, has a selectively adjustable gain, one being used to amplify audio or voice frequency signals in one direction, and the other being used to amplify the voice frequency signals in the other direction.

Term sets 18 and 20 are circuits for interconnecting a four-wire circuit (such as the repeater's four-wire circuit 21) and a two-wire circuit (such as the two-wire transmission line 12 or the two-wire circuit in central office 14). Term set 18 comprises a hybrid circuit 26 and a balance network 28 (see FIGS. 2 and 3). Term set 20 likewise comprises a hybrid circuit 30 and a balance network 32.

Except for the adjustment of the balance network and certain other circuit elements to be described later on, the circuit design of term set 20 is the same as that of term set 18. Accordingly, to the extent that the two term sets are alike, like reference characters have been applied to designate like components or parts except that the reference numerals applied to designate the components of term set 20 have been suffixed by the letter "a" to distinguish them from the reference numerals used to identify the components of term set 18.

The repeater's four-wire circuit 21 is connected between the hybrid circuit 26 in term set 18 and the hybrid circuit 30 in term set 20 and is defined by two separate unbalanced sections or signal transmission paths 31 and 33. The unbalanced signal transmission path 31 contains amplifier 22 and provides for the transmission of voice frequency signals from hybrid circuit 30 to hybrid circuit 26. The unbalanced signal transmission path 33 contains amplifier 24 and provides for the transmission of voice frequency signals from hybrid circuit 26 to hybrid circuit 30.

The voice frequency signals conducted over transmission path 31 are the ones that originate from the subscriber side of the repeater (i.e., from telephone 16), and the voice frequency signals conducted over transmission path 33 are the ones that originate from the central office side of the repeater. The signals originating from the central office side are amplified by amplifier 24, and the signals originating from the subscriber side are amplified by amplifier 22.

Each of the hybrid circuits 26 and 30 is used in the customary way to define a signal interface between a bidirectional, balanced two-wire line or transmission path and the individual sections or unidirectional transmission paths of a four-wire line or circuit.

In the illustrated embodiment, hybrid circuit 26 defines the signal interface between the central office's two-wire line 35, 37 (consisting of the tip and ring leads or conductors 35 and 37 which connect to the conventional relay circuit 36 of FIG. 1 and other equipment) and the unbalanced signal transmission paths of the repeater's four-wire circuit 21. To accomplish this, hybrid circuit 26 has a bidirectional two-wire port 38, a single-ended receive port 39, a single-ended transmit port 40 and a balance network port 41.

Terminals 42 and 43 define the two-wire port 38 and connect to the central office's tip and ring leads 35 and 37, whereby balanced differential voice frequency signals are transmitted in opposite directions between the central office's signal transmitting two-wire circuit and hybrid circuit 26. Terminal 44 defines the receive port 39 with respect to common (which is virtually ground) and connects to the repeater's transmission path 31 for receiving the unbalanced or single-ended voice frequency signals from path 31. Terminal 45 defines the transmit port 40 with respect to ground or common and connects to the repeater's transmission path 33 to feed the central office-transmit signals from hybrid circuit 26 to path 33. Port 41 is defined by terminal 46 (see FIG. 3) which connects to balance network 28. The common referred to above is the common line or terminal for a split power supply (e.g., ±12 Volts) and is at ground potential or at least virtually ground.

In one direction (subscriber to central office), hybrid circuit 26 thus operates to convert the unbalanced subscriber-transmit signals (i.e., the signals originating from telephone 16) on the repeater's transmission path 31 into balanced signals on the central office's signal transmitting two-wire circuit. In the opposite direction (central office to subscriber) hybrid circuit 26 operates to convert the central office-transmit balanced signals (i.e., the signals originating from the central office) on the central office's two-wire circuit into unbalanced or single-ended signals on the repeater's transmission path 33.

In hybrid circuit 30, the terminals 42a, 43a of the two wire port 38a are connected to transmission line 12 for transmitting the balanced bidirectional signals between line 12 and hybrid circuit 30, the terminal 44a of receive port 39a is connected to the repeater's transmission path 33 for receiving the unbalanced central office-transmit signals from path 33, the terminal 45a of transmit port 40a is connected to the repeater's path 31 to apply the unbalanced subscriber-transmit signals to the repeater's transmission path 31, and the terminal of port 41a is connected to balance network 32.

In one direction (central office to subscriber) hybrid circuit 30 thus operates to convert the unbalanced or single-ended central office-transmit signals on the repeater's transmission path 33 into balanced signals on the two-wire transmission line 12. In the opposite direction (subscriber to central office) hybrid circuit 30 operates to convert the balanced subscriber-transmit signals on line 12 into unbalanced signals on the repeater's transmission path 31.

Figure 3:
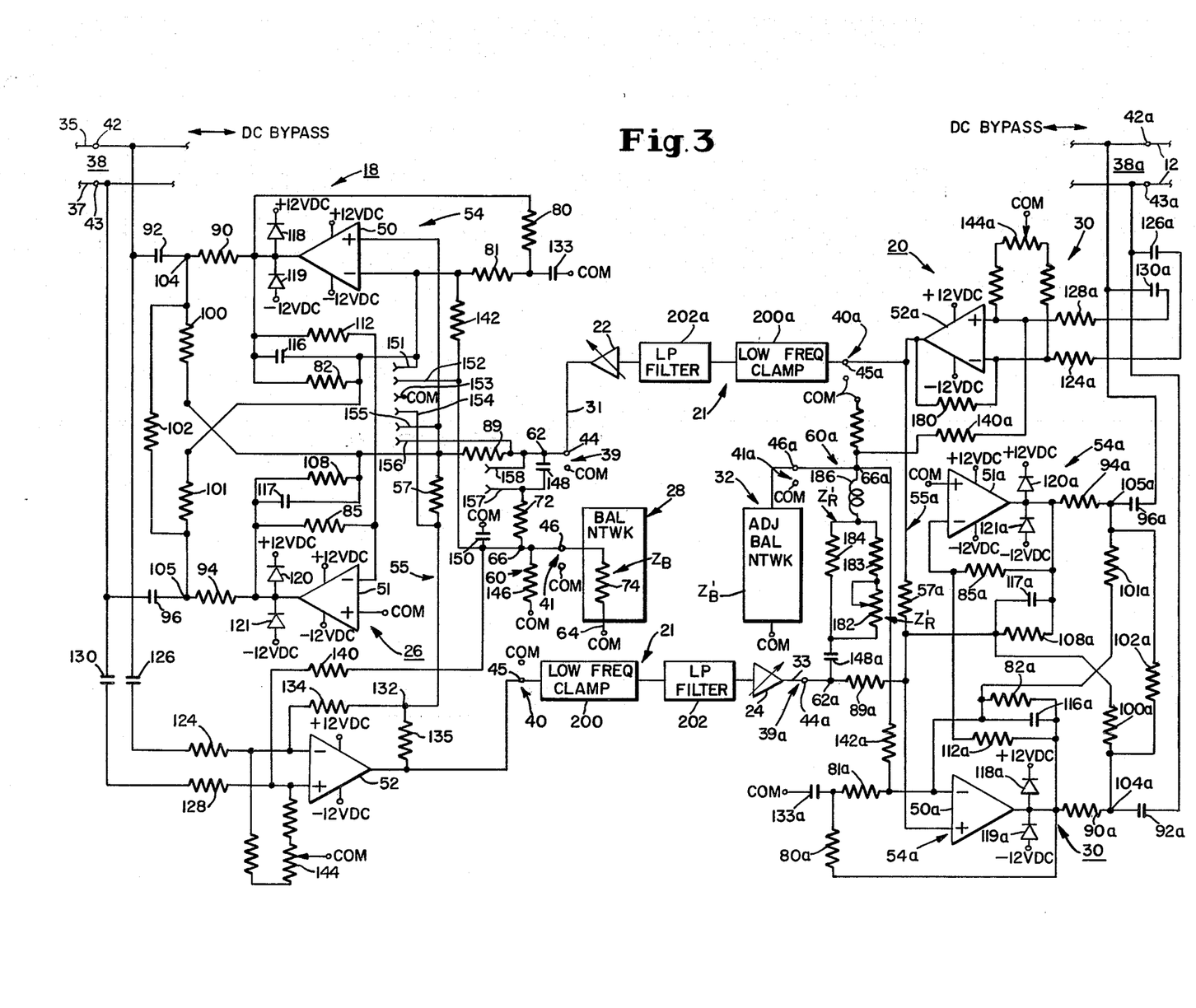
FIG. 3 illustrates the schematic circuit diagram of the term sets shown in FIG. 2 as well as the schematic block diagram for the repeater's four-wire circuit.

Referring to FIG. 3, hybrid circuit 26 consists of just three operational amplifiers 50, 51 and 52 and a number of two-terminal components to be described shortly. Operational amplifiers 50 and 51 are connected together to define with other components a differential current line driver 54. Line driver 54 converts the unbalanced subscriber-transmit signals on the repeater's transmission path 31 into a balanced, differential signal for driving the two-wire circuit in the central office. A feedback circuit 55 for line driver 54 causes the latter to generate a simulated impedance $Z_o$ (see FIG. 4). The simulated impedance $Z_o$ is the impedance in which repeater 10 is terminated on its central office side. It is the input impedance and the output impedance of line driver 54 because signals are being transmitted in both directions on the central office two wire line 35, 37. Being the terminating impedance, $Z_o$ appears across terminals 42 and 43 and is the load impedance seen by the signals originating from the central office side.

According to one important aspect of this invention, amplifier 52 is connected in the hybrid circuit in such a way to perform plural functions. First, it forms a part of feedback loop or circuit 55 and senses the differential voltage across the central office's tip and ring leads 35 and 37 to drive a feedback resistor 57 for generating the simulated impedance $Z_o$. Second, by having a differential input differentially coupled to the central office's tip and ring leads 35 and 37 and by having a single-ended output coupled to terminal 45 of the hybrid's transmit port 40, it converts the differential signals originating from the central office into an unbalanced signal for application to the repeater's unbalanced transmission path 33. Third, the differential input of amplifier 52 is connected to a bridge circuit 60 (see FIG. 4) in such a manner that the subscriber-transmit signals arriving at the hybrid circuit's receive port 39 are prevented from being returned to the hybrid circuit's transmit port 40 when the bridge circuit is balanced. Fourth, it affords rejection of longitudinal signals as well as affording simplified trimming of the circuit for achieving complete rejection of the longitudinal signals. These matters will be discussed in greater detail later on.

The value of the simulated terminating impedance $Z_o$ can be selected to be 900 ohms plus 2 mf or 600 ohms plus 2 mf. This load impedance $Z_L$ is the impedance seen by the line driver 54 across the tip and ring leads 35 and 37 and is also referred to as the average central office impedance or simply the office impedance. This central office load impedance is assumed to be either 900 ohms (local) or 600 ohms (toll) in series with a 2.16 microfarad capacitor. In the illustrated embodiment, the central office load impedance is 900 ohms in series with the 2.16 microfarad capacitor, although it will be appreciated that the principles of this invention are equally applicable to the 600 ohm value or any other value for that matter.

Figure 4:
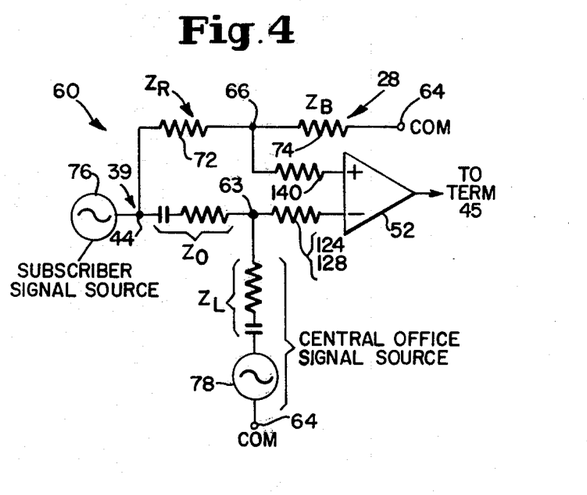
FIG. 4 is a simplified diagram of the bridge circuit used in the left-hand term set of FIGS. 2 and 3, the left side of the illustrated bridge circuit being a simplified single-ended equivalent of the actual circuit itself.

Referring to the simplified diagram in FIG. 4, bridge circuit 60 is a four-legged network having four impedances (one in each leg) connected in a diamond configuration. The first leg between nodes 44 and 63 is formed by the simulated impedance $Z_O$. The second leg between nodes 63 and 64 is in series with the first leg and is formed by the central office load impedance $Z_L$. This makes up one side of bridge circuit 60. The illustration of this side is the single-ended equivalent of the actual circuit.

Figure 2:
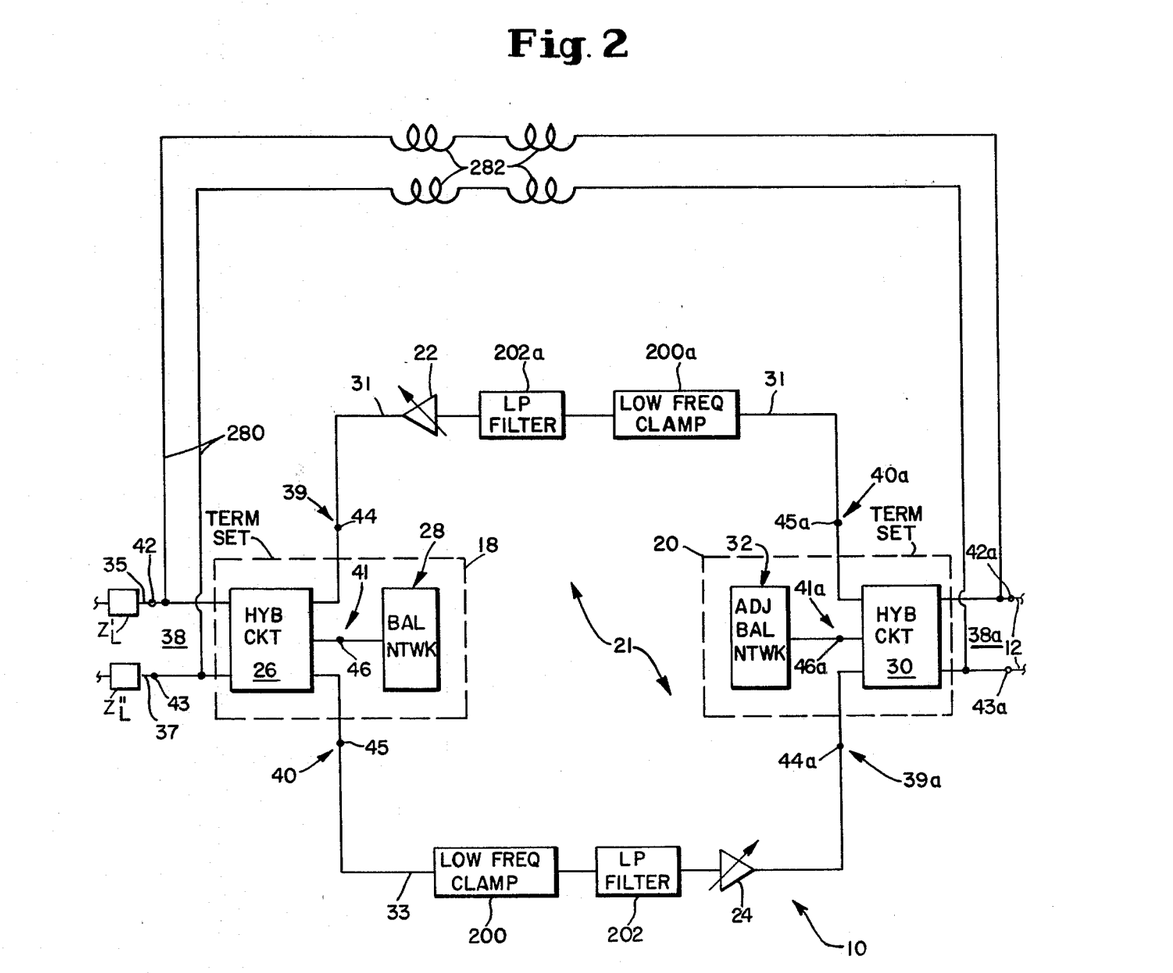
FIG. 2 is a schematic block diagram of the repeater shown in FIG. 1.

Node 63 is not shown in either FIG. 2 or 3. It should be appreciated that if node 63 were shown in those figures it would appear at terminals 42 and 43. In other words, these terminals are the same as node 63. For ease of illustration and for the sake of clarity in the figures, node 63 has been omitted from FIGS. 2 and 3 but appears in the single ended equivalent circuit of FIG. 4.

On the other side of bridge circuit 60, one leg is connected between node or terminal 44 and a further node 66, and the other leg is connected between nodes 66 and 64. The leg between nodes 44 and 66 is formed by a real impedance $Z_R$ and is typically made equal to $Z_o$. The leg between nodes 66 and 64 is formed by the characteristic impedance $Z_B$ of balance network 28 and is usually adjusted to match the load impedance $Z_L$.

To achieve a balanced bridge configuration the ratio of $Z_R$ (the real impedance) to $Z_B$ (the balance network impedance) is required to be equal to the ratio of $Z_o$ (the simulated impedance) to $Z_L$ (the central office load impedance). That is, $Z_R/Z_B$ is made equal to $Z_o/Z_L$. When these ratios are equal, the bridge is balanced. The purpose of the feedback loop 55, as will be explained in detail later, is to generate the simulated impedance $Z_o$ and to provide it with the value equal to $Z_R$ in order to balance bridge circuit 60.

Because repeater 10 is terminated immediately at the central office 14 in the illustrated embodiment, there is no section of transmission cable between the repeater and the central office. When using term set 18 in terminal applications, impedances $Z_B$ and $Z_R$ need not include capacitors and instead may be entirely resistive, with $Z_R$ being a resistor 72 and $Z_B$ also being a resistor 74 as shown in FIG. 4. This is not true for the cable side, however, and the 2 mf capacitors must be included to make $Z_R$ equal to $Z_o$ and $Z_B$ equal to $Z_L$.

There are two important considerations for selecting the simulated impedance $Z_o$ to match (i.e., equal) the central office load impedance $Z_L$: Echo return loss and repeater stability. For signals originating from central office 14 and terminating in the simulated impedance $Z_o$, the match between $Z_o$ and $Z_L$ avoids the occurrence of a reflected signal and consequent echo. In addition, for signals originating from the subscriber a bridge balance with $Z_B$ equal to $Z_L$ avoids the occurrence of a return signal to the subscriber that could cause instability in the repeater.

Accordingly, the impedance ratio $Z_o/Z_R$ for one side of bridge circuit 60 is unity. This requires the impedance ratio $Z_L/Z_B$ on the other side of the bridge circuit to be adjusted to unity.

In the illustrated embodiment, the value of each of the resistors 72 and 74 is selected to be 900 ohms. It will be appreciated, however, that other values may be selected for resistors 72 and 74 as long as the ratio of $Z_o/Z_R$ is kept equal to the ratio of $Z_L/Z_B$.

The subscriber-transmit signal voltage source developed at the output of the gain amplifier 22 is indicated at 76 in FIG. 4 and applies the signal voltage to node 44. For central office originating signal, nodes 64 are to be connected to ground or common.

The non-inverting and inverting inputs of amplifier 52 are connected through resistances to nodes 66 and 63, respectively. Nodes 63 and 66 are also referred to as the bridge circuit's balance points. The signal voltage seen by amplifier 52 at its inverting input is essentially the voltage developed across impedance $Z_L$ while the signal voltage seen by amplifier 52 at its non-inverting input is essentially the voltage developed across resistor 74. Thus, no signal will be developed at the output of amplifier 52 by the subscriber-transmit signal source 76 when bridge circuit 60 is balanced.

From the foregoing description it is clear that bridge circuit 60 has the effect of cancelling the response of amplifier 52 to the subscriber-transmit signal whereby the subscriber-transmit signals arriving at termianl 44 from transmission path 31 are prevented from being returned to terminal 45 and hence to transmission path 33.

In the single-ended equivalent circuit of the central office load impedance and the central office-transmit signal source (i.e., the central office signal source that supplies the voice frequency signals for transmission down line 12 to telephone 16), the central office-transmit signal source (as indicated at 78 in FIG. 4) appears to be in series with the load impedance $Z_L$ in the bridge leg containing $Z_L$ between nodes 63 and 64.

The generation of a central office-transmit signal voltage by source 78 will therefore develop a voltage difference across the non-inverting and inverting inputs of amplifier 52, causing the amplifier to respond by developing an output voltage that varies as a function of the balanced signal originating from the central office.

In the illustrated embodiment, the operational amplifier 50 in line driver 54 is provided with a negative feedback loop or circuit having resistors 80 and 81. Resistors 80, 81 are connected in series between the amplifier's output and the amplifier's inverting input. Amplifier 51 also has a negative feedback loop containing a resistor 85.

The output of gain amplifier 22 is connected through a resistor 89 to the non-inverting input of amplifier 50 to feed the amplified, unbalanced subscriber-transmit signal to amplifier 50. Resistor 89 acts as the output impedance for the subscriber-transmit signal voltage source 76 (FIG. 4) that is developed at the output of gain amplifier 22.

The output of amplifier 50 is connected through an output resistor 90 and a small coupling capacitor 92 to terminal 42 and hence to the central office tip conductor 35. Similarly, the output of amplifier 51 is connected through an output resistor 94 and a small coupling capacitor 96 to terminal 43 and hence to the central office ring lead 37.

The actual output impedance of line driver 54 is defined by resistors 100 plus 101 in parallel with resistor 102 plus a capacitive reactance. Resistor 102 is bridged across nodes or circuit points 104 and 105 and lowers the output impedance to a desired value. Node 104 is at the juncture between resistor 90 and capacitor 92, and node 105 is at the juncture between resistor 94 and capacitor 96.

The output of amplifier 50 develops one of the two components that make up the differential subscriber-transmit signal at port 38. The other component of the differential signal is established by feeding the output of amplifier 50 through an input resistor 112 to the inverting input of amplifier 51. The signal fed to amplifier 51 will therefore be inverted with unity gain so that the signal components at the output of amplifiers 50 and 51 are equal in magnitude but opposite in phase. These two signal components are applied to the central office tip and ring conductors 35 and 37, respectively, and together they constitute the differential subscriber-transmit signal that is fed to the central office. The output of amplifier 50 varies directly with the signal voltage developed by source 76 (FIG. 4), while the output of amplifier 51 varies inversely with the signal voltage of source 76.

To establish line driver 54 as a differential current source, resistors 100, 101, 82 and 108 are used as feedback resistors. Resistor 100 is connected between node 104 and the non-inverting input of amplifier 50, and resistor 82 is connected between the output terminal of amplifier 50 and the inverting input of amplifier 50. Resistor 101 is connected between node 105 and the inverting input of amplifier 50, while resistor 108 is connected between the output terminal of amplifier 51 and the non-inverting input of amplifier 50.

Thus, resistors 100 and 82 are connected to opposite sides or ends of resistor 90 to sense the voltage across resistor 90, while resistors 101 and 108 are connected to opposite ends of resistor 94 to sense the voltage across resistor 94. Since the sensed voltage across resistor 90 is proportional to the line or amplifier output current conducted by resistor 90, then the differential feedback signal established by feedback resistors 100 and 82 is also proportional to the amplifier output current conducted by resistor 90. Similarly, the differential feedback signal established by feedback resistors 101 and 108 is proportional to the amplifier output current conducted through resistor 94 because the sensed voltage across resistor 94 is proportional to the output current conducted through resistor 94.

The two differential feedback signals (i.e., the one developd by resistors 100 and 82, and the other developed by resistors 101 and 108) are algerbraically summed by amplifier 50 and operate to maintain the output signal current through resistor 90 at a value that is substantially independent of the load impedance seen by amplifier 50 (i.e., the load that is energized by the line or amplifier output current on tip conductor 35). Thus, the output signal current of amplifier 50 will vary directly with signal voltage developed by the signal voltage source 76 and will not, to any significant extent, be dependent upon the central office tip conductor load impedance $Z'_L$ (see FIG. 2). As a result the amplifier output signal source developed at node 104 is a load-independent current source.

A current source is also effectively established at node 105 because amplifier 51 is driven by and, except for phasing, tracks the output of amplifier 50. Accordingly, the signal current supplied to ring conductor 37 by amplifier 51 will also be substantially constant for a given value of input signal voltage from source 76 regardless of the load ($Z_L''$) seen in ring conductor 37. The net result is that line driver 54 acts as a differential current source. Thus, line driver 54 is a current driver and is used to drive the two-wire line 35, 37. The advantage of this feature is that the sizes of capacitors 92 and 96 may be much smaller than that required if line driver 54 were a voltage source. Aside from being costly, large capacitors tend to load down the line during signalling. Impedance $Z_L$ seen in FIG. 4 is the single-ended equivalent of impedances $Z_L'$ and $Z_L''$.

By connecting feedback resistors 82, 100, 101 and 108 to the input of amplifier 50 in the manner shown, longitudinal signals will effectively be cancelled by the algebraic summation of signals at the inputs of amplifier 50. Capacitors 116 and 117 may be bridged across resistors 82 and 108, respectively, to provide out-of-band high frequency stability if desired. Diodes 118, 119, 120 and 121 may be connected in the manner shown to provide lightening protection.

As shown in FIG. 3, the feedback loop 55 is completed by connecting the inverting input of amplifier 52 through an input resistor 124 and a coupling capacitor 126 to terminal 42 and hence to the central office tip conductor 35, by connecting the non-inverting input of amplifier 52 through an input resistor 128 and a coupling capacitor 130 to terminal 43 and hence to the central office ring conductor 37, and finally by connecting feedback resistor 57 between a voltage output node 132 for amplifier 52 and the non-inverting input of amplifier 50. Capacitors 126 and 130 are required to reject d.c. and are relatively large to aid longitudinal balance. A further capacitor 133 may be connected between common and the node or juncture between resistors 80 and 81 to compensate for the effects of capacitors 126 and 130 on the current and to thus insure out-of-band low frequency stability.

From the foregoing description it will be appreciated that amplifier 52 has its differential input differentially coupled across the central office's two-wire line that is defined by tip and ring conductors 35 and 37. Thus, differential signals originating from the central office side and applied to the two-wire central office line will be coupled to the input side of amplifier 52 where they are sensed and converted by amplifier 52 into unbalanced or single-ended signals for transmission through transmit port 40 and transmission path 33 to drive hybrid circuit 30. Node 132 is at the juncture between two serially connected negative feedback resistors 134 and 135 for amplifier 52.

As previously described, the bridge legs containing resistors 72 and 74 are connected in series between the output of gain amplifier 22 and common. Thus, the signal voltage source at gain amplifier 22 drives two signal transmission paths, one being through resistor 89 to amplifier 50 and the other being through resistor 72 wherein resistor 72 acts as the source resistor for the balance network resistor 74. To complete the bridge circuit connections to amplifier 52, node 66 between resistor 72 and 74 is connected through an input resistor 140 to the non-inverting input of amplifier 52. The connection of amplifier 52 to the other side of bridge circuit 60 is established through resistors 124 and 128. The combination of these two resistors is shown as a single resistor in the simplified bridge circuit diagram of FIG. 4. Resistor 140 is used to cancel the effect of the resistors 124 and 128 on the balance of bridge circuit 60 by cancelling whatever resistors 124 and 128 sense as a function of the subscriber-transmit signal to keep the subscriber-transmit signal from returning through amplifer 52 to hybrid circuit 30 when the bridge circuit is balanced.

An additional resistor 142 is connected between the bridge circuit node 66 and the inverting input of amplifier 50 to cancel the effect of resistor 140 on the output of line driver 54. In this regard it will be noted that the connection of resistor 140 in the circuit establishes an additional, undesired signal path through resistors 72, 140, 134 and 57 for conducting the signal from gain amplifier 22 to the inverting input of the line driver amplifier 50. The magnitude of the current error developed by this undesired signal path is dependent upon the size of resistor 140 times the gain of amplifier 52. Resistor 142 is sized and connected to apply to the inverting input of amplifier 50 a signal that is equal to this error signal at the amplifier's non-inverting input to thus cancel the error. Therefore, the error signal created by undesired path through resistor 140 has no effect on the output level of line driver 54.

From the foregoing description it will be appreciated that upon sensing a voltage across the central office's two-wire line 35, 37, amplifier 52 develops an output voltage that drives the current or line driver 54 through feedback resistor 57 to cause the generation of the simulated impedance $Z_o$ with the correct value that matches resistor 72. Hence the purpose of feedback circuit 55 is to generate the 900 ohm or 600 ohm plus 2 mf with $Z_B$ adjusted to match $Z_L$ thereby balancing the bridge circuit 60, and by balancing bridge circuit 60 subscriber-transmit signals originating from the subscriber or transmission line side of the repeater are prevented from returning to the repeater's subscriber side by way of the path through amplifier 52. Amplifier 52 is also considered to be driving the line driver 54 because a portion of the line driver's output current is a function of the output voltage of amplifier 52 and hence the line voltage that it senses.

The line voltage sensed by amplifier 52 will be only the differential voltage that is not cancelled or nulled by the differential input of amplifier 52. Hence, amplifier 52 does not sense the subscriber-transmit signal voltage (i.e., the signal originating from the subscriber side of repeater 10) because of the effect of bridge circuit 60. By sensing a voltage, it is understood that amplifier 52 will develop an output voltage in response to a voltage appearing on the two-wire line 35, 37. If the voltage on the two-wire line 35, 37 is only due to the subscriber-transmit signals originating from the subscriber side of the repeater, then the voltage at the output of the amplifier will become zero or substantially zero when bridge circuit 60 is balanced, and the bridge circuit is balanced only when the balance network 74 equals the central office load impedance $Z_L$.

The manner in which the simulated impedance $Z_o$ is generated with the feedback loop containing amplifier 52 is best explained by determining the relationship of the differential output current of line driver 54 to the signal voltage sensed by amplifier 52 and the other components in the feedback loop 55. To simplify this explanation, the differential current source established by line driver 54 will be considered to be ideal (i.e., high output impedance), and the voltage sensing amplifier 52 is considered to be ideal (i.e., high input impedance) to ignore the effects of such things as capacitors 92 and 96 and resistors 100–102.

Against the foregoing background, it will be appreciated that the output voltage of amplifier 52 for driving resistor 57 is equal to the line voltage (V) sensed by amplifier 52 at its input multiplied by the voltage gain (GV) of amplifier 52. The current ($I_{in}$) through resistor 57 is determined by the output voltage of amplifier 52 and represents a portion of the input current for line driver 54. The equation for the input current ($I_{in}$) fed through resistor 57 to the input of line driver 54 is:

$$I_{in} = V(GV)/R_{57} \qquad (1)$$

where $R_{57}$ is the value of resistor 57.

Thus, the output current $I_{out}$ developed by line driver 54 in response to the input current $I_{in}$ is the input current $I_{in}$ multiplied by the line driver's current gain (GI). Hence, the equation for the output current $I_{out}$ becomes:

$$I_{out} = V(GV)(GI)/R_{57} \qquad (2)$$

The output current is connected to sensed voltage V. Thus, the simulated impedance $Z_o$ is equal to $V/I_{out}$. Solving the equation (2) for $V/I_{out}$, we have $$V/I_{out} = R_{57}/GI(GV) = Z_o \qquad (3)$$

Thus, the simulated impedance is equal to and determined by the value of feedback resistor 57 divided by the product of the voltage and current gains in the loop. Equation (3) is a fair approximation of the more complex equation for the actual circuit in which line driver 54 is not an ideal current source and amplifier 52 does not have an ideal input impedance.

Upon setting the current and voltage gains, the correct value of $Z_o$ can be established by selection of the value of resistor 57.

From the foregoing it will be appreciated that the input current $I_{in}$ conducted through resistor 57 has the effect of forcing the actual output impedance of line driver 54 down to the selected simulated impedance $Z_o$.

Representative values for the significant components and other values for establishing $Z_o$ is:
GV = 3.16
GI = 50
$R_{57}$ = 150 Kohms
Actual output impedance of line driver 54 = 15 Kohms +0.11 mf.

Representative values of other resistors of interest are as follows where the numerical subscript is the reference numeral used to designate the components in FIG. 3:

$R_{89}$ = 44.2 Kohms
$R_{140}$ = 140 Kohms
$R_{142}$ = 44.2 Kohms
$R_{124}$ = 140 Kohms
$R_{128}$ = 140 Kohms It also will be noted that the net feedback established by loop 55 is negative because of the feed into the negative of inverting input of amplifier 52.

In the special situation where the only signals on the two-wire line 35, 37 are those originating from the subscriber side of the repeater, the output of amplifier 52 will be zero provided that the balance network $Z_B$ is at a value equal to that of the load impedance $Z_L$ to balance bridge circuit 60. Under such a condition the drive for feedback resistor 57 appears to be removed, and the output voltage level of line driver 54 would increase if it were not for resistor 142.

In such a situation, resistor 142 provides the drive for line driver 54 for generating the proper value of output drive to $Z_L$ independent of the value of $Z_B$ which affects the value of the signal through resistor 140. The net result is that proper output level is produced for generating the correct bridge-balancing value of impedance $Z_o$ even though the output of amplifier 52 is zero for the special situation mentioned above.

The reduction of the output impedance to obtain the simulated impedance value ($Z_o$) gives the appearance of a large 2 mf capacitor in series with 900 ohms for voice level a.c. signals for the subscriber and central office signals. Hence, the sizes of capacitors 92, 96 may be reduced as mentioned previously. It will be noted that in the single-ended equivalent of term set 18 and other parts of the circuit, the simulated or output impedance $Z_o$ and the central office load impedance $Z_L$ are effectively connected in series between the output of amplifier 22 and ground or common.

Hence, the need for large coupling capacitors and the need for bulky expensive coupling or hybrid transformers are all eliminated with the low cost term set circuit of this invention by using just three operational amplifiers, namely amplifiers 50–52.

Furthermore, all of the voltages to be sensed or nulled are lumped together at a common place, namely the differential input of amplifier 52. Trimming the circuit for rejection of longitudinal signals is therefore simplified and is accomplished with a single selectively adjustable resistance 144 that is connected across the inverting and non-inverting inputs of amplifier 52 as shown in FIG. 3.

Resistor 146 may be connected in term set 18 in the manner shown in FIG. 3 to compensate the circuit for errors. A capacitor 148 may be connected in series with resistor 72 to compensate for the fact that capacitors 126, 130 are not perfect short circuits. Capacitor 150 is connected to compensate for the effect of shunt capacitance of the d.c. bypass coils.

Figure 6:
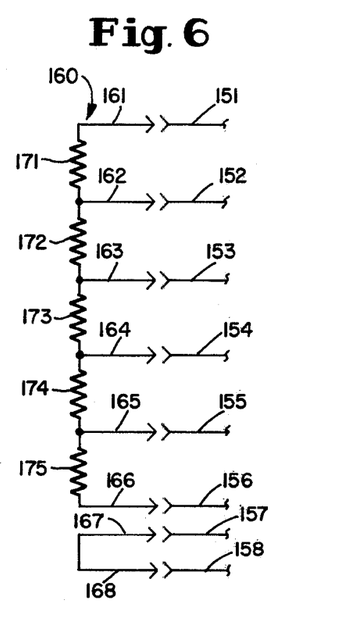
FIG. 6 is a schematic diagram of a plug-in resistor network which is used with the left-hand term set of FIGS. 2 and 3 for converting the simulated terminating impedance from a value of 900 ohms+2mf to 600 ohms+2mf.

If desired, a set of terminal or connector elements 151, 152, 153, 154, 155, 156, 157 and 158 may be connected in the manner shown in FIG. 3 and are used with a plug-in resistor network 160 (FIG. 6) for selectively converting the 900 ohm+2 mf impedance input into a 600 ohm+2 mf input. Network 160 comprises a set of connector elements 161, 162, 163, 164, 165, 166, 167 and 168 and a group of resistors 171, 172, 173, 174 and 175 bridged across pre-selected ones of connector elements 161–166, and a short is placed across elements 167, 168. When resistor network 160 is plugged into the term set circuit, connector elements 161–168 made contact with connector elements 151–158, respectfully. Capacitor 148 will therefore be shorted, and the various resistors in network 160 will be placed in parallel or other relation with the resistors already in term set 18 to provide resistor combinations that develop the 600 ohm+2 mf simulated impedance when the circuit is in operation. Thus the 900 ohm+2 mf impedance is converted into a 600 ohm+2 mf circuit simply by plugging network 160 into the term set.

Apart from the balance network 32, term set 20 differs from term set 18 in the following respects:

First a single resistor 180 is used as a negative feedback for amplifier 52a instead of two resistors as in the case of amplifier 52, and the drive for both feedback resistor 57a and the unidirectional transmit port 40a is taken directly from the output pin of amplifier 52a.

Second, an impendance $Z_R'$ with a trimmable resistor 182 is used in the bridge circuit for term set 20 instead of the single fixed resistor (72) that is used in the bridge circuit for term set 18.

In addition to the adjustable resistor 182, and real impedance $Z_R'$ in bridge circuit 60a includes resistors 183 and 184. Resistor 184 is in parallel with the series connected combination of resistors 182 and 183, and the overall combination of resistors 182–184 is in series with capacitor 148a and a coil 186 between bridge nodes 62a and 66a. Resistor 182 is used to trim the circuit to compensate for errors. Thus, the two bridge circuits for term sets 18 and 20, respectively, are the same except that the balancing network ($Z_B'$) to match various cables and the trimmable impedance $Z_R'$ to adjust for manufacturing tolerances.

In addition to amplifier 24, the transmission path 33 in the repeater's four-wire circuit 21 includes a low frequency clamping circuit 200 and a low pass filter 202. This circuit configuration is used for loaded cable.

Clamping circuit 200, filter 202 and amplifier 24 are connected in series between the transmit terminal 45 of term set 18 and the receive terminal 44a. Clamping circuit 200 is connected between terminal 45 and filter 202, filter 202 is between circuit 200 and amplifier 24, and amplifier 24 is between filter 202 and terminal 44a. Thus, the unbalanced central office signal at terminal 45 is first fed through clamping circuit 200, then through filter 202 and finally through amplifier 24 to terminal 44a.

The purpose of clamping circuit 200 is to reduce low-frequency out-of-band high level signals for maintaining stability. The low-frequency clamping function of circuit 200 prevents high level low frequency signals from overloading the current driver amplifiers 50a and 51a and thereby causing objectionable signal distortion in amplifiers 50a and 51a. High level low frequency signals may develop because of the relatively small sizes of capacitors 92a and 96a. More importantly, by driving amplifiers 50a and 51a into non-linearity or distortion, such high level low frequency signals could upset the balance of bridge circuit 60a. If this condition occurs, a portion of the central office transmit signal would be fed back through term set 20 and amplifier 22, with the result that oscillation or singing could occur and could sustain itself.

Thus, the main purpose of clamping circuit 200 is to clamp these high level low frequency signals at values where the foregoing objectionable conditions do not occur and to do so without clamping or otherwise distorting the signals of higher frequencies.

Figure 5:
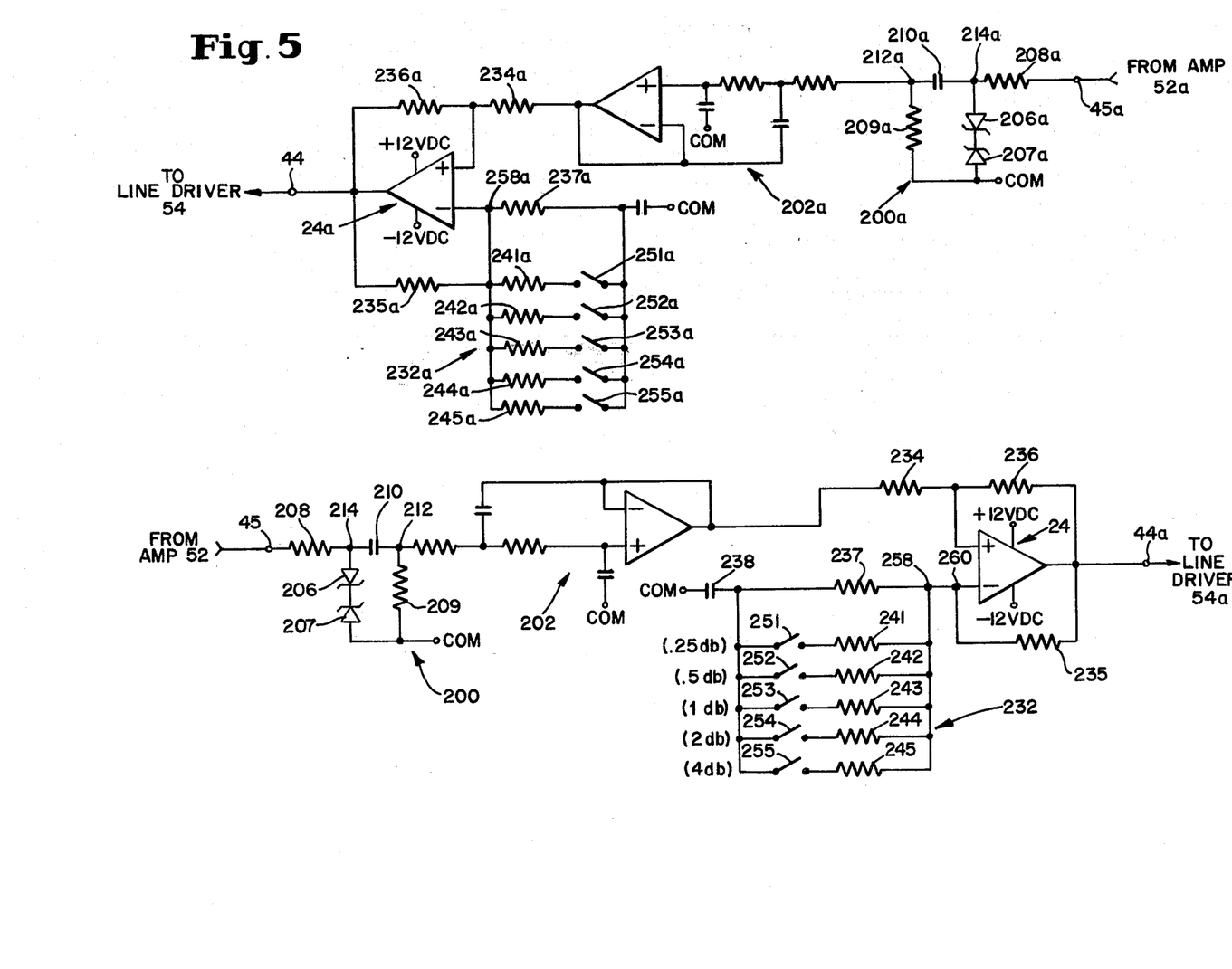
FIG. 5 is a schematic diagram of the various circuits making up the repeater's four-wire circuit, including the low frequency clamping circuit and the adjustable gain amplifier of this invention.

To accomplish its low frequency clamping function as well as voltage divider and high pass filter functions, clamping circuit 200 is shown in FIG. 5 to comprise a pair of zener diodes 206 and 207, a pair of resistors 208 and 209 and a capacitor 210. Resistor 208 and capacitor 210 are connected in series in the signal path between the input of circuit 200 at terminal 45 and the output of circuit 200 at node 212. Resistor 209 is connected between node 212 and common or ground. Resistor 209 is therefore connected across the output of the clamping circuit 200 and thus cooperates with resistor 208 to define a resistive divider in circuit 200. Diodes 206 and 207 are connected in series between common and ground and the node 214 between resistor 208 and capacitor 210. Diodes 206 and 207 are in oppositely poled relation having their anode terminals interconnected as shown.

The input voltage signal ($V_i$) for circuit 200 appears at terminal 45, and the output voltage signal ($V_o$) for circuit 200 appears at node 212 and drives the low pass filter 202. Diodes 206 and 207 are connected between node 214 and common. When diodes 206 and 207 conduct, a clamp circuit is therefore created across node 214, to limit the output voltage ($V_o$) of circuit 200 to a maximum value.

Because of the frequency dependent impedance of capacitor 210, the signal voltages dropped across resistor 208 and capacitor 210, respectively, will be dependent upon the frequency of the input signal at terminal 45. As the frequency of the input signal ($V_i$) decreases, the voltage dropped across capacitor 210 increases, and the voltage across resistor 209 decreases somewhat. At some point, depending upon the selection of the zener breakdown voltages, the voltage at node 214 will become high enough to force the back biased one of the two diodes 206, 207 to conduct, thereby establishing at some predetermined frequency the clamp level that prevents the output voltage from overloading the current driver 54a. The selection of the zener or clamping voltage along with the sizes of the capacitor and resistor components in circuit 200 is such that the zener breakdown and hence the clamp voltage occurs when high level low frequency signals are present. For this purpose, capacitor 210 is made sufficiently large that it is a virtual short in the mid-band frequency (i.e., above the upper limit of the high level low frequencies). For this mid-band range, therefore, the voltage at node 214 will be below the zener of clamping voltage so one zener diode or the other will not conduct. In this manner, only the low signal frequencies with a high enough level are clamped by circuit 200 without clamping the mid-band frequencies.

When the frequency of the input signal ($V_i$) is high enough to make capacitor 210 a virtual short circuit, then the divider effect is performed just by resistors 208 and 209. Under such a condition, it is evident that the output voltage ($V_o$) becomes equal to ($V_i$) ($R_{209} + R_{208}$), where $R_{209}$ is the size of resistor 209, and $R_{208}$ is the size of resistor 208.

Resistor 208 is made large enough so that it essentially approaches a current source driving through a capacitor-resistor network where the output is taken across resistor 209 while the voltage across capacitor 210 varies as a function of frequency and increases greatly at low frequencies even though the gain is more constant.

In addition to defining the voltage divider described above, it will be appreciated that resistors 208, 209 and capacitor 210 also operate as a high pass filter to reduce the low frequency out-of-band gain for stability. This is the case because, as the frequency of the signal decreases, the impedance developed by capacitor 210 increases to decrease the output voltage $V_{out}$ in prescribed manner.

Low pass filter 202, which establishes the high frequency cutoff (about 2.8 kHz), may be of any suitble circuit design such as the active type shown. The purpose of filter 202 is to insure out-of-band stability at high frequencies.

Amplifier 24 comprises an operational amplifier and has a gain-adjusting network 232 for selectively adjusting the gain of the operational amplifier. Amplifier 24 is provided with an input resistor 234, a feedback resistor 235 between the amplifier's output and inverting input, and a further feedback resistor 236 between the amplifier's output and non-inverting input. The output of filter 202 is fed through input resistor 234 of amplifier 24. The inverting input of amplifier 24 is connected through an input resistor 237 and a capacitor 238 to common or ground. Capacitor 238 provides additional low frequency de-coupling for added low frequency stability. By virtue of the foregoing resistor connections it will be appreciated that amplifier 24 is connected in a non-inverting configuration.

According to a further feature of this invention, the gain-adjusting network 232 comprises a set of binary weighted resistors 241, 242, 243, 244 and 245 and a corresponding number of manually operable switches 251, 252, 253, 254 and 255 for individually connecting resistors 241-245 into the active circuit. This gain-adjusting circuit configuration provides a linearly weighted, incremental gain-adjustment in db.

As shown, switches 251-255 are connected in series with resistors 241-245, respectively. The connections are such that closure of switches 251-255 will individually connect their associated binary weighted resistors (241-245) in parallel with resistor 237. Thus, closure of switch 251 connects resistor 241 in parallel with resistor 237, closure of switch 252 connects resistor 242 in parallel with resistor 237, closure of switch 253 connects resistor 243 in parallel with resistor 237, and so on. The binary weighting of resistors 241-245 is such that resistor 244 is twice as large as resistor 245, resistor 243 is twice as large as resistor 244, resistor 242 is twice as large as resistor 243, and resistor 241 is twice as large as resistor 242.

The connections of resistors 234-236 are such that a negative resistance is produced in series with the binary weighted resistors 241-245 and is considered to appear between points 258 and 260 in the amplifier circuit on the input side of amplifier 24. Thus, with all of the switches 251-255 open, the voltage gain (GV) of amplifier 24 will be:

$$GV = 1 + R_f/R_{in}$$

where $R_f$ is the value of feedback resistor 235, and $R_{in}$ is the sum of the above-mentioned negative resistance and resistor 237.

By connecting one or more of the binary weighted resistors 241-245 in parallel with resistor 237, the resistrance of the resulting parallel combination will be less than that of resistor 237 alone. As a result, the input resistance $R_{in}$ is reduced. Reduction of $R_{in}$ produces an increase in the amplifier's voltage gain because the gain, as seen from the preceding equation, varies as an inverse function of $R_{in}$. Connecting one or more of the binary weighted resistors 241-245 in parallel with resistor 237 also reduces the resistance between circuit points 258 and 238. The reduction of this resistance in combination with the negative resistance generated by resistors 234 and 236 has the effect of keeping the increments of db gain increase equal or linearized for successive closures of switches 245, 244, 243, 242, and 241. If, for example, the gain of amplifier 24 is set at unity with all of the switches 251-255 open, then the db gain can be adjusted from zero db to 7.75 db in equal, ¼ db steps by closing switches 251-255 individually and in various combinations depending upon the binary weighted relationship. An example of the db relationship for resistors 241-245 is shown in FIG. 5 to the left of resistors 241-245.

In addition to amplifier 22, the transmission path 31 in the repeater's four-wire circuit 21 includes a low frequency clamping circuit 200a and an active low pass filter 202a. Amplifier 22, clamping circuit 200a and filter 202a are all connected in the same manner and have the same circuit design as the amplifier, clamping circuit and low pass filter in transmission path 33. Accordingly, like reference characters have been applied to designate like components for the circuits in transmission paths 31 and 33 except that the letter "a" has been added to the reference numeals for the circuits in transmission path 31 to distinguish them from the reference characters used for the circuit components for transmission path 33.

Balance network 32 may be of any suitable, conventional circuit design and is matched to the particular cable used to make up transmission 12 to maintain stability and to prevent the occurence of echo from signals originating from the central office side of repeater 10. When the terminating impedance $Z_L'$ is known, the value of the balancing network impedance $Z_B'$ (for network 32) can then be selected to match $Z_L$ to avoid reflections. Balancing network 32 is typically adjustable to match different cable impedances.

In the illustrated embodiment, line driver 54a is driven by the feedback circuit 55a to generate a simulated output impedance ($Z_o'$). The impedance $Z_B'$ in bridge circuit 60a is adjusted to equal the load impedance $Z_L'$ to maintain the balance of the bridge. The embodiment shown in FIGS. 3 and 5 is typically for loaded cable.

As shown in FIGS. 2 and 3, repeater 10 also advantageously includes a two-wire d.c. by-pass line 280 with coils 282 for blocking a.c. current but allowing d.c. current to pass from the repeater's central office side to the repeater's subscriber side.

For unloaded cable, the filter 202 may advantageously be replaced with an adjustable frequency dependant equalizer 290 (FIG. 7) to compensate for the frequency dependant signal response associated with non-loaded cable. Non-loaded cable, as distinguished from loaded cable, has more loss at high signal frequencies than at low signal frequencies. This gives rise to the desirability of equalization to flatten the response in the pass band for the telephone communication system.

Figure 7:
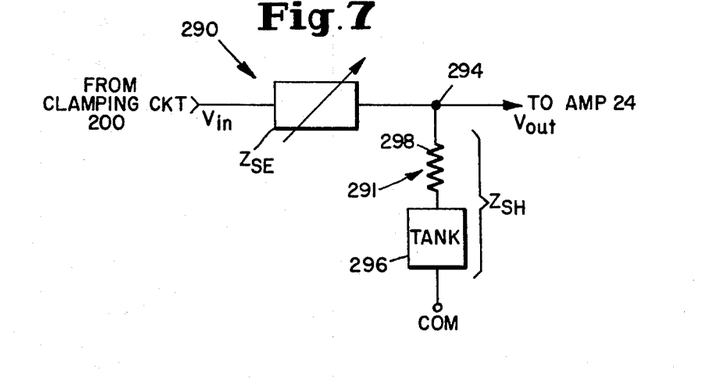
FIG. 7 is a block diagram of the equalizer circuit of this invention.
Figure 8:
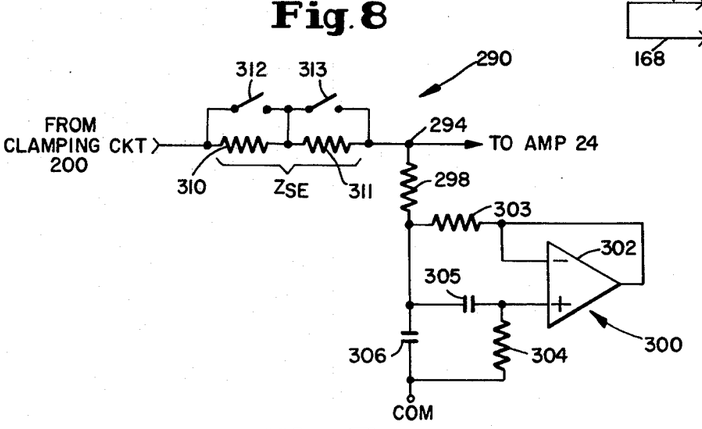
FIG. 8 is a schematic diagram of the equalizer shown in FIG. 7.

In the embodiment shown in FIGS. 7 and 8, equalizer 290 comprises a frequency dependent voltage divider 291 having a frequency dependent shunt impedance $Z_{SH}$ and a frequency independant series impedance $Z_{SE}$. The series impedance $Z_{SE}$ is in series between the output of clamping circuit 200 and the input of amplifier 24 in transmission path 33. The shunt impedance $Z_{SH}$ is connected from the input of amplifier 24 to common. The divider's output voltage $V_{out}$ is taken across ground or common and the node 294 between impedances $Z_{SE}$ and $Z_{SH}$. The shunt impedance $Z_{SH}$ comprises an LC tank circuit 296 in series with a resistor 298.

In the embodiment shown in FIG. 8, the inductor for tank 296 is established by an active circuit 300 having an operational amplifier 302 with unity gain, resistors 303 and 304 and a capacitor 305. This active circuit is conventional. The capacitor for tank circuit 296 is indicated at 306 in FIG. 8 and is in series with resistor 298 between the latter and ground or common.

As shown, resistor 303 is connected between resistor 298 and the inverting input of amplifier 302, resistor 304 is connected between ground or common and the non-inverting input of amplifier 302, and capacitor 305 is connected between the non-inverting input of amplifier 302 and the node or juncture between resistor 298 and capacitor 306.

The series impedance $Z_{SE}$ in this embodiment consists of two series connected resistors 310 and 311. Manually operable switches 312 and 313 bridge resistors 310 and 311, respectively, to provide a selective adjustment of the series impedance $Z_{SE}$ for accommodating different lengths of unloaded cable.

The components of tank circuit 296 are selected to produce resonance and hence maximum impedance at about 2.8 kHz or some other suitable out-of-band frequency. The remaining components of equalizer 290 are selected to add the correct amount of loss at frequencies lower than the resonant frequency (2.8 kHz in this embodiment) to make the loss for such lower frequencies adjustable relative to that of the resonant frequency without affecting the loss at the tank circuit's resonant frequency. In this way the frequency response of the combination of cable and the repeater for frequencies lower than the resonant frequency is flattened so that loss is substantially equal for frequencies equal to and less than the resonant frequency.

As is apparent from FIG. 7, the ratio of output voltage to input voltage ($V_{out}/V_{in}$) is equal to $Z_{SH}/(Z_{SH}+Z_{SE})$. When $Z_{SH}$ is at its maximum impedance it is large enough to make the effect of $Z_{SE}$ small, thus provide a gain ($V_{out}/V_{in}$) which approaches unity. Unity gain is achieved by closing both switches 312 and 313 to short circuit both of the series resistors 310 and 311. The gain is reduced, creating loss, by opening either one or both switches.

According to a further feature of this invention resistors 310 and 311 are binary weighted, the latter resistor 311 being twice as large as resistor 310, and resistor 312 being sized to be about twice as large as resistor 311. By this circuit design the adjustment with switches 312 and 313 is set or calibrated directly in equal increments of db loss. At 1000 Hz, for example, the db loss is 1 db when switch 312 is opened and switch 313 is closed, the db loss increases to 2 db when switch 313 is opened and switch 312 is closed, and the loss further increases to 3 db when both switches are opened. As compared with prior adjustable equalizers, the foregoing features reduces the number of switches needed and eliminates the need for referring to tables to convert switch positions into db. Resistor 298 is relatively large to limit the attenuation effect of the resonant inductance at low frequencies (300 Hz–400 Hz) to thus maintain the flat response at such low frequencies. Additional switches and resistors can be added to increase the range and/or steps of attenuation.

Tha gain of amplifier 24 is the same for all of the pass band frequencies at least so that all such frequencies come out of amplifier 24 at substantially the same, predetermined db level (e.g., zero db).

It will be apparent that the transmission path 31 will also be equipped with an equalizer corresponding to equalizer 290 when repeater 10 is used with non-loaded cable.

Although the four-wire circuit 21 is shown as two one-conductor lines (i.e., paths 31, 33), it will be appreciated that each transmission path may alternatively be a two-wire line, if desired.

In the gain-adjusting circuit 232 for amplifier 24 it is clear that the number of different available gain values is $2^n$ and that the number of available equal db increments is $2^n-1$ where n in both cases (i.e., $2^n$ and $2^n-1$) is the number of gain-adjusting switches. In the example shown in FIG. 5, five switches (251–255) are used. Therefore, the number of different available db gain values is 32 and the number of available equal db gain increments is 31.

The formulas $2^n$ and $2^n-1$ also apply to the equalizer circuit 290. In the example shown in FIG. 8, n is equal to 2 because two switches (312, 313) are used. Hence, the number of available values of db loss is 4 and the number of available equal db increments of loss is 3.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An electronic hybrid circuit including a balancing network and providing a signal-transmitting connection between a two-wire, bidirectional voice frequency signal-transmitting means and a four-wire, voice frequency signal-transmitting means in a voice frequency communication system, said electronic hybrid circuit comprising a two-wire port adapted to be connected to said two-wire means, a signal receive port adapted to be connected to a first signal-transmission portion of said four-wire means for receiving incoming voice frequency signals from said four-wire means, a signal transmit port adapted to be connected to a second signal-transmission portion of said four-wire means for supplying outgoing voice frequency signals thereto, a differential current driver electrically connected between said two-wire port and said receive port and responsive to an incoming voice frequency signal arriving at said receive port from said four-wire means for applying to said two-wire port an outgoing differential voice frequency signal, a signal feedback circuit electrically connected between said two-wire port and an input of said differential current driver and having a differential amplifier, said amplifier having a differential input coupled to said two-wire port for developing an output voltage in response to differential signal voltage developed across said two-wire port by an incoming differential voice frequency signal that is transmitted over said two-wire means toward said electronic hybrid circuit, said differential current driver being responsive to said output voltage for generating a simulated terminating impedance at said two-wire port, and said amplifier having an output electrically connected to said transmit port and being responsive to said incoming differential signal for supplying an outgoing voice frequency signal to said transmit port for transmission over said second transmission portion of said four-wire means, and means cooperating with said differential amplifier for preventing the signals arriving at said receive port from said four-wire means from returning to said transmit port.

2. The electronic hybrid circuit defined in claim 1 wherein the voice frequency signal arriving at said receive port from said four-wire means is an unbalanced signal, wherein said differential current driver has means for converting the unbalanced signal arriving at said receive port into a differential signal for application to said two-wire port and hence to said two-wire means, and wherein said differential amplifier converts said incoming differential signal into an unbalanced signal for application to said transmit port.

3. The electronic hybrid circuit defined in claims 1 or 2 including means connected between said receive port and the input of said differential current driver to define a first signal transmission path for signals arriving at said receive port from said four-wire means, and first and second impedances electrically connected in series between said receive port and a node for defining a second transmission path for the signals arriving at said receive port from said four-wire means, said first and second impedances being interconnected at a common node, and the values of said first and second impedances being pre-selected such that the ratio of said first impedance to said second impedance is at least substantially equal to the ratio of said simulated impedance to a load impedance seen in the two-wire means by the outgoing differential signal that is applied to said two-wire port for transmission over said two-wire means, and means connecting said node to at least one differential input of said amplifier to provide for the cancellation of said outgoing differential signal that is fed to the input of said amplifier by virtue of the coupling of said amplifier to said two-wire port.

4. The electronic hybrid circuit defined in claims 1 or 2 wherein said differential current driver comprises first and second amplifiers respectively coupled to different ones of the two terminals defining said two-wire port, and means cooperating with said first and second amplifiers for defining a pair of current sources applying the differential signal current to said two-wire means.

* * * * *